(12) United States Patent
Ade et al.

(10) Patent No.: US 11,109,526 B1
(45) Date of Patent: Sep. 7, 2021

(54) SEED PLANTING DEVICE AND METHOD OF PLANTING

(71) Applicant: Group of 4 LLC, Williamsport, PA (US)

(72) Inventors: Daniel E. Ade, Williamsport, PA (US); Destin Benson, Williamsport, PA (US); Philip N. Cotner, II, Williamsport, PA (US); Carlene Ryder, Williamsport, PA (US)

(73) Assignee: Group of 4 LLC, Williamsport, PA (US)

( * ) Notice: Subject to any disclaimer, the term of this patent is extended or adjusted under 35 U.S.C. 154(b) by 143 days.

(21) Appl. No.: 16/273,735

(22) Filed: Feb. 12, 2019

(51) Int. Cl.
 A01C 7/04 (2006.01)
 A01G 25/09 (2006.01)
 A01C 5/06 (2006.01)

(52) U.S. Cl.
 CPC ............ *A01C 7/048* (2013.01); *A01C 5/064* (2013.01); *A01C 5/066* (2013.01); *A01C 7/044* (2013.01); *A01G 25/09* (2013.01)

(58) Field of Classification Search
 CPC ......... A01C 7/048; A01C 5/064; A01C 5/066; A01C 7/044; A01C 7/04; A01C 7/00; A01C 7/042; A01C 5/062; A01C 5/06; A01C 5/00; A01G 25/09; A01G 25/00
 See application file for complete search history.

(56) References Cited

U.S. PATENT DOCUMENTS

| 25,417 A | 9/1859 | Johnson |
|---|---|---|
| 782,459 A | 2/1905 | Morris |
| 851,171 A | 4/1907 | Israel |
| 1,062,766 A | 5/1913 | Carter |
| 1,109,756 A | 9/1914 | Hurlbut |
| 1,143,980 A | 6/1915 | McComb |
| 1,160,279 A | 11/1915 | Grey et al. |
| 1,292,082 A | 1/1919 | Sanford |
| 2,281,927 A | 5/1942 | Fischer |
| 2,571,491 A | 10/1951 | Schindler |
| 2,843,068 A | 7/1958 | Smith et al. |
| 2,924,186 A | 2/1960 | Landeen |
| 3,065,605 A | 11/1962 | Zitko |
| 3,294,045 A | 12/1966 | Kelley et al. |
| 3,328,916 A | 7/1967 | Okita et al. |
| 3,380,626 A | 4/1968 | Giannini |
| 3,385,242 A | 5/1968 | Chancellor |
| 3,408,823 A | 11/1968 | Okita et al. |
| 3,445,981 A | 5/1969 | Hori |
| 3,622,042 A | 11/1971 | Fischer |
| 3,637,108 A | 1/1972 | Loesch et al. |
| 3,648,631 A | 3/1972 | Fiedler et al. |
| 3,731,842 A | 5/1973 | Schlegel |
| 3,757,996 A | 9/1973 | Lienemann et al. |
| 3,772,849 A | 11/1973 | Tobin, Jr. et al. |
| 3,906,875 A | 9/1975 | Kesinger et al. |
| 3,999,690 A | 12/1976 | Deckler |
| 4,092,936 A | 6/1978 | Griffin et al. |
| 4,167,910 A | 9/1979 | Pretzer |
| 4,253,411 A | 3/1981 | Shulzhenko et al. |
| 4,762,075 A | 8/1988 | Halford |
| 4,866,879 A | 9/1989 | Wood et al. |
| 5,165,351 A | 11/1992 | Billings |
| 5,325,801 A | 7/1994 | Fiorido |
| 5,623,885 A | 4/1997 | Hagg |

(Continued)

*Primary Examiner* — Christopher J. Novosad

(74) *Attorney, Agent, or Firm* — Hooker & Habib, P.C.

(57) ABSTRACT

A seed planting device adapted to planting seeds at regular intervals into the ground.

20 Claims, 5 Drawing Sheets

(56) References Cited

U.S. PATENT DOCUMENTS

| | | |
|---|---|---|
| 6,240,674 B1 | 6/2001 | Otake et al. |
| 6,615,754 B2 | 9/2003 | Unruh et al. |
| 6,701,664 B2 | 3/2004 | Ahm |
| 6,735,902 B1 | 5/2004 | Ahm |
| 7,614,353 B2 | 11/2009 | Hainzl et al. |
| 9,313,944 B1 | 4/2016 | Faivre et al. |
| 2005/0268546 A1 | 12/2005 | Ahm |
| 2010/0282145 A1 | 11/2010 | Preheim et al. |
| 2011/0271888 A1 | 11/2011 | Sauder |
| 2013/0152836 A1 | 6/2013 | Deppermann et al. |

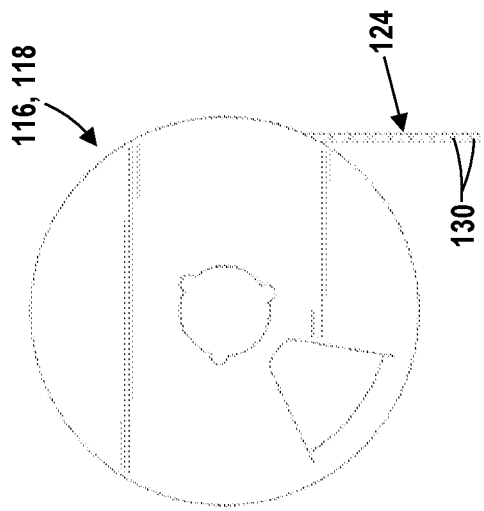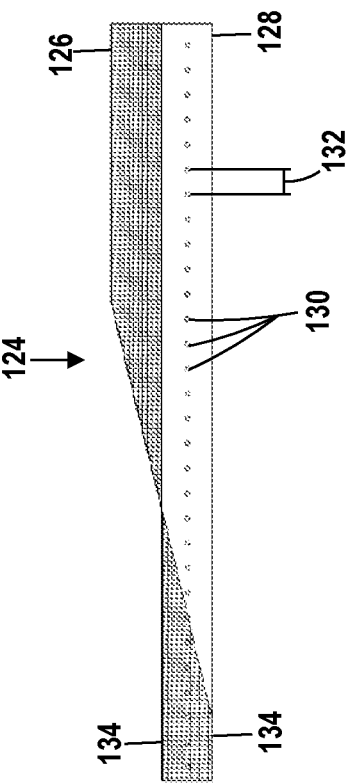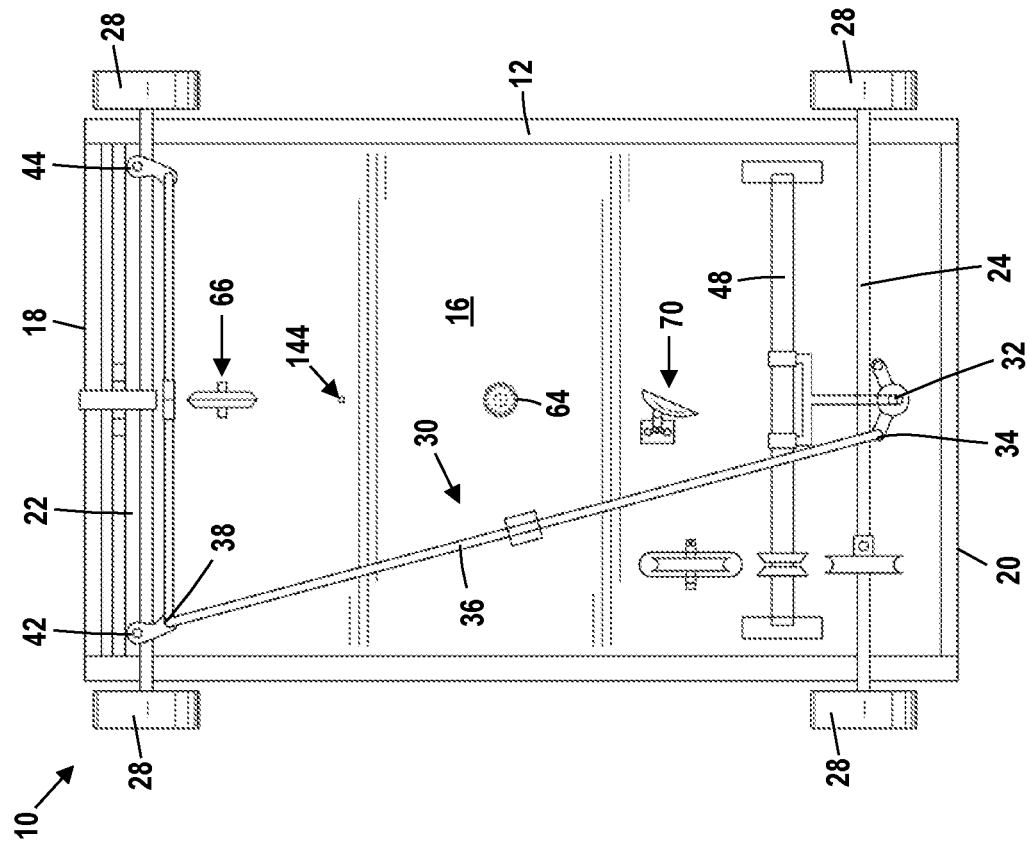

SEED PLANTING DEVICE AND METHOD OF PLANTING

FIELD OF THE DISCLOSURE

The disclosure relates to a seed planting device and related method for planting seeds. The disclosed device is adapted to plant seeds at regular intervals into the ground.

BACKGROUND OF THE DISCLOSURE

Planting devices for the planting of seeds are known in the prior art. These planting devices commonly have hoppers or like containers for storing seeds. A problem with the use of hoppers is the controlled distribution of seeds into ground furrows. Hopper feed units can become blocked by misfeeding jammed seeds during operation, resulting in irregular seed placement and/or a halt in device operation.

Planters that use seed tape having individual seeds fixed at specified distances along a tape carrier are also known in the prior art. These systems implant the seed tape in whole within the ground. A problem with the use of seed tape in planters results from seed tape being stored in coiled reels. When seed tape is removed from a reel for planting and placed into a ground furrow, it may revert to its coiled form and become tangled, resulting in irregular seed placement and planter jamming.

Thus, there is a need for an improved seed planting device for reliably depositing seeds into the ground at regular intervals for planting.

SUMMARY OF THE DISCLOSURE

A seed planting device and its method of use is disclosed. The device is adapted to reliably deposit seeds into the ground at regular intervals for planting.

The device includes a seed dispensing assembly. The dispensing assembly includes a quantity of seed units stored on a length of seed tape and an air distribution unit.

The air distribution unit applies blasts of compressed air to the seed units held by the seed tape. The air blasts dislodge the seed units from the seed tape. Dislodged seed units are forced away from the device and deposited at regular intervals within a ground furrow formed by the device.

The device may also include a water dispenser assembly to apply water to newly-deposited seeds.

The disclosed device reliably deposits seed units into the ground at regular intervals without the risk of seed hopper failure or seed tape entanglement during planting.

Other objects and features of the device will become apparent as the description proceeds, especially when taken in conjunction with the accompanying drawing sheets illustrating the device.

DESCRIPTION OF THE DRAWINGS

FIG. 3 is a bottom view of the disclosed planting device;
FIG. 4 is a view of a seed tape reel used with the device;
FIG. 5 is a view of seed tape used with the device.

DETAILED DESCRIPTION

Figure 1:
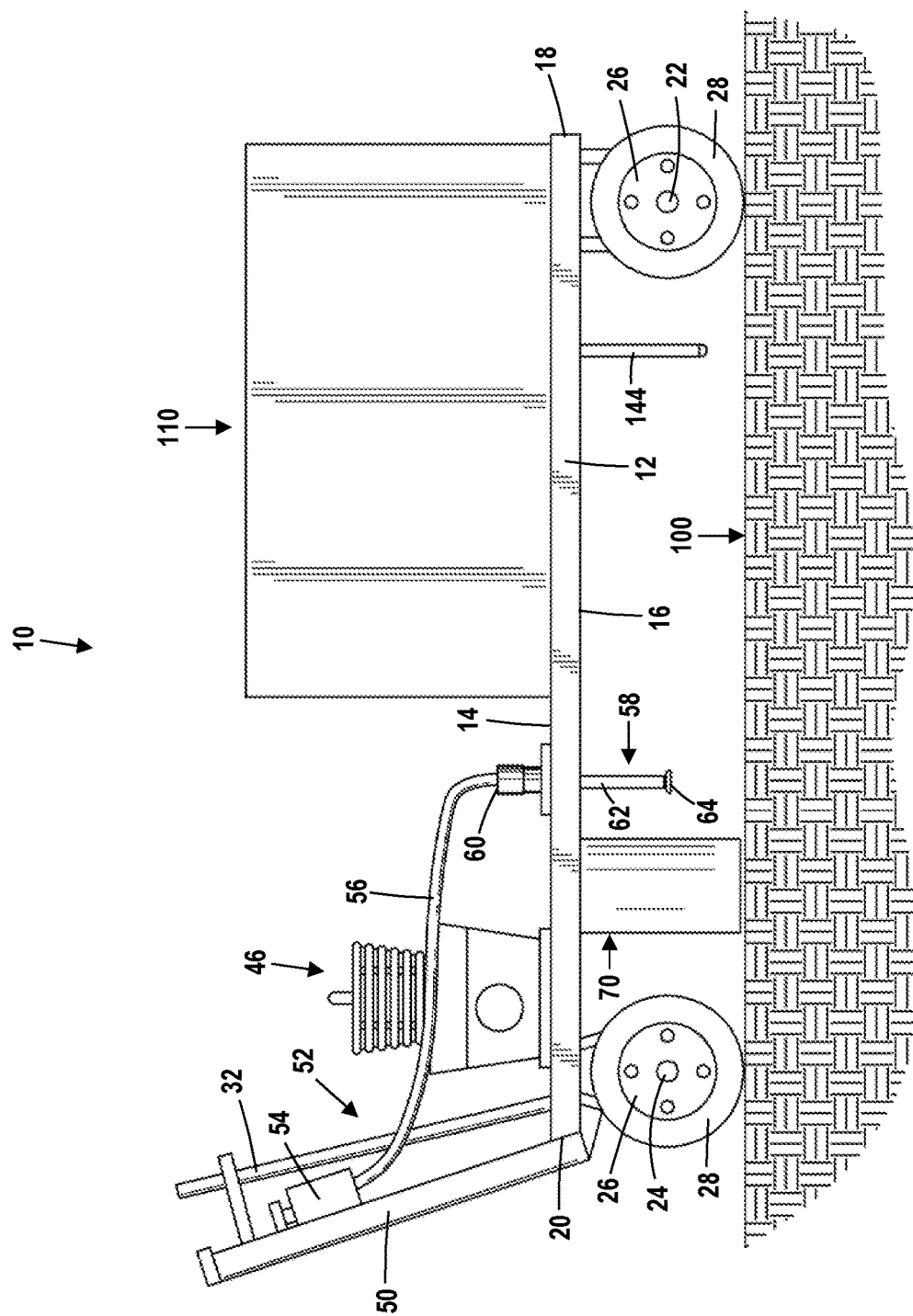
FIG. 1 is a side view of the disclosed planting device.

FIG. 1 is a side view of a seed planting device 10.

Device 10 includes a generally flat, planar frame 12 on which other device components are mounted. Frame 12 includes a top surface 14, a bottom surface 16, a front portion 18 and a rear portion 20.

Frame 12 includes front axle 22 and rear axle 24 upon which wheels 26 are mounted. Wheels 26 may include rubber or like elastomeric tires 28. In alternate embodiments, device 10 may include treads or other conveyance elements or conveyance means to allow device 10 to travel across a planting area.

Frame 12 also includes a steering assembly 30 having an operator-controlled steering column 32. Column 32 is joined to a pivot joint 34 which is joined to steering rod 36, pivot joint 38 and front steering rod 40. Front steering rod 40 is joined to steering spindles 42 and 44 to turn wheels 26 at front axle 22.

Device 10 includes a motor 46 mounted to frame top surface 14. Motor 46 is joined to a drive axle 48. Drive axle 48 may be coupled to front axle 24 in order to turn axle 24 and propel device 10.

In embodiments, motor 46 may be an internal combustion engine that operates on gasoline or a like fuel.

Frame rear portion 20 includes end support post 50 that extends upwardly from frame 12 proximate column 32.

Water dispensing assembly 52 is mounted to frame 12. Water dispensing assembly 52 includes a water reservoir 54 mounted to post 50 and a conduit tube 56 extending from reservoir 54 to a nozzle assembly 58. Tube 56 is attached to an inlet 60 on nozzle assembly pipe 62. Pipe 62 extends through frame 12 and downwardly from frame bottom surface 16 to a nozzle head 64 to flow quantities of water 65 therefrom. See FIGS. 1 and 2.

In alternate embodiments, water dispensing assembly 52 may include an additional storage reservoir (not illustrated). The additional storage reservoir is mounted elsewhere on frame 12 and is in fluid communication with reservoir 54 and/or conduit tube 56 to provide additional quantities of water to nozzle assembly 58.

Furrow generator 66 is mounted to frame bottom surface 16 proximate the front portion 18 of frame 12. Furrow generator 66 extends downwardly from bottom surface 16. In embodiments, furrow generator 66 may be a disc-shaped furrow blade which rotates about axle 68.

Furrow generator 66 is extended into the ground 100 to generate a ground furrow 102 as explained in greater detail below.

Earth coverer 70 is mounted to frame bottom surface 16 between the front portion 18 and a rear portion 20 of frame 12. In embodiments, earth coverer 70 may be a rectangular-shaped plow blade. Earth coverer 70 extends downwardly from bottom surface 16 and may be positioned to replace earth over a ground furrow created by furrow generator 66 as explained in greater detail below.

Frame 12 supports seed dispensing assembly 110. Assembly 110 includes a rectangular enclosure 112 positioned over assembly components. Enclosure 112 is mounted to frame top surface 14 proximate frame front portion 18.

Seed dispensing assembly 110 includes a seed tape assembly 114. Assembly 114 includes seed tape storage reel 116 and seed tape take-up reel 118. Reel 116 and reel 118 may be generally cylindrical in form and mounted to spindle shafts 120 and 122. Spindles shafts 120 and 122 are mounted to supports within assembly 110 and rotate to allow like rotation of reels 116, 118.

In embodiments, spindle shaft 122 may be coupled to a spindle drive including a drive motor (not illustrated). The spindle drive turns spindle shaft 122 to likewise turn take-up reel 118.

Figure 2:
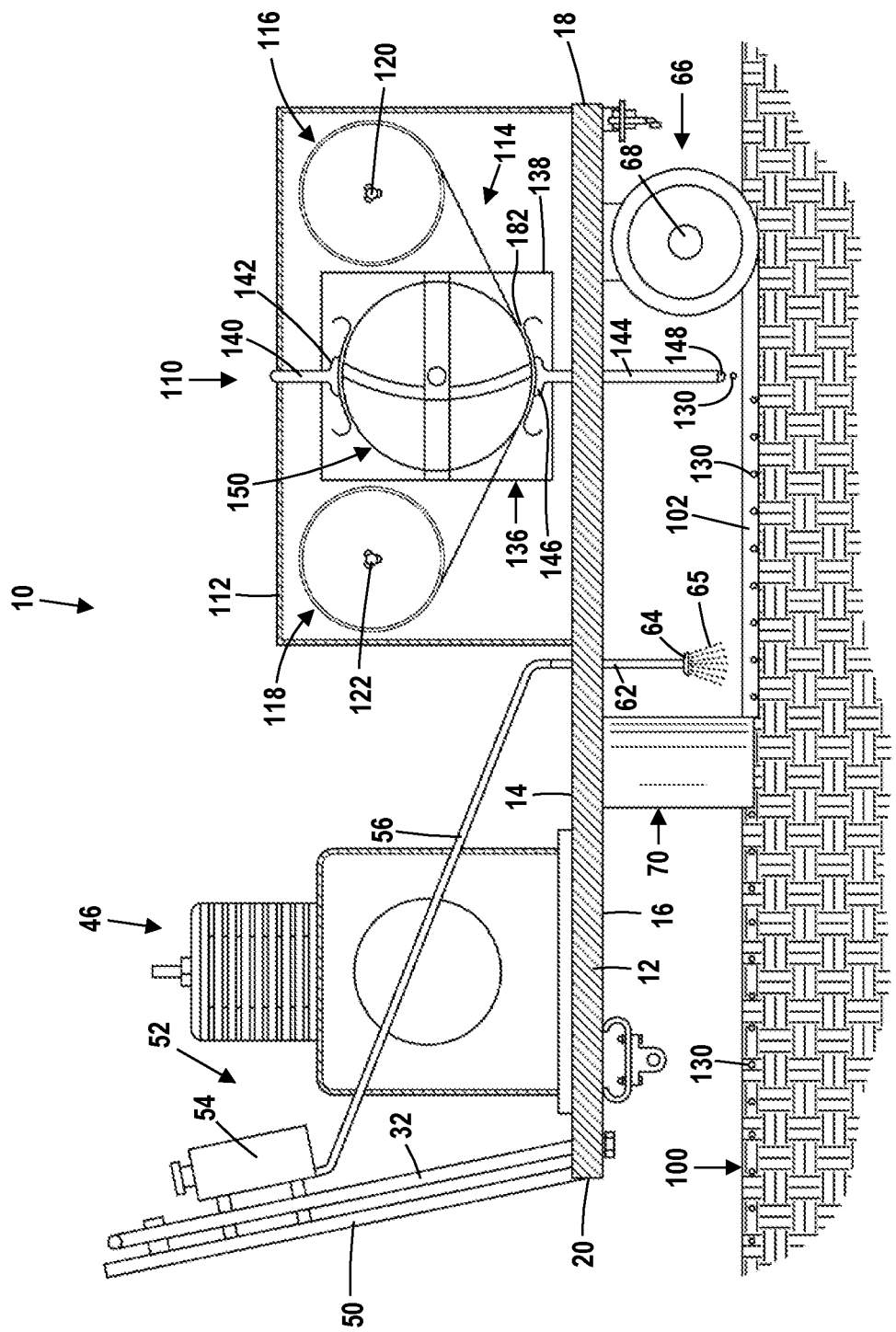
FIG. 2 is a sectional side view of the disclosed planting device.

Seed tape storage reel 116 contains a quantity of seed tape 124 stored thereupon in a coiled configuration. Seed tape 124 extends from reel 116 to reel 118 as shown in FIG. 2.

Seed tape 124 is made up of two elongate substrate layers 126, 128. Layers 126, 128 may be made of paper or another flexible, webbing material.

Seed units 130 are placed at regular distance intervals 132 between layers 126, 128. A non-toxic, bio-degradable adhesive may be used to fix layers 126, 128 together to form seed tape 124. In embodiments, outer edges 134 of seed tape 124 may be reinforced by additional flexible material to improve tape durability during use.

In embodiments, a seed unit 130 is made up of a single ungerminated seed. In alternate embodiments, seed unit 130 is made up of a number of ungerminated seeds.

In other embodiments, seed tape 124 and/or seed unit 130 may include a quantity of fertilizer containing nitrogen, phosphorus, potassium and/or other nutrients to assist in the germination and growth of seeds.

Seed tape 124 is directed from reel 116 to reel 118 to air distribution unit 136.

Air distribution unit 136 includes a frame 138 mounted to seed dispensing assembly 110. Air input tube 140 extends from an air source (not illustrated) to an outlet 142 proximate the top of frame 138. In embodiments, the air source may be an air compressor or a canister of compressed air or another like gas. Seed chute 144 extends from a chute inlet 146, through frame 12 and downwardly from frame bottom surface 16 to a chute outlet 148.

Air distribution unit 136 also includes air distribution wheel assembly 150. Assembly 150 includes a frame 152 which is mounted to air distribution unit frame 138. Frame 152 includes frame inlet 154 and frame outlet 156.

Air distribution wheel 158 is mounted to frame 152 by shaft 160. Air distribution wheel 158 has the general form of a hollow disc having a circular rim portion 170. Six apertures 172 are located about rim portion 170. In embodiments, apertures 172 may be spaced equidistant arc lengths 174 from each other along rim portion 170.

Pairs of 180-degree opposed apertures 172 are joined by through passages 176, 178 and 180. Through passages 176, 178 and 180 may be made of flexible tubing extending between opposed apertures 172.

Air distribution wheel 158 is mounted within frame 152 and is free to rotate about shaft 160. In embodiments, shaft 160 may be coupled to a shaft drive including a drive motor (not illustrated). The shaft drive turns spindle shaft 160 to likewise turn air distribution wheel 158.

Seed dispensing assembly 110 includes a seed tape passage 182 extending through seed dispensing assembly 110 and air distribution unit 136 and located proximate the bottom of air distribution wheel 158 and chute outlet 148. A length of seed tape 124 extends between reel 116 and reel 118 and passes through a seed tape passage 182.

Figure 7:
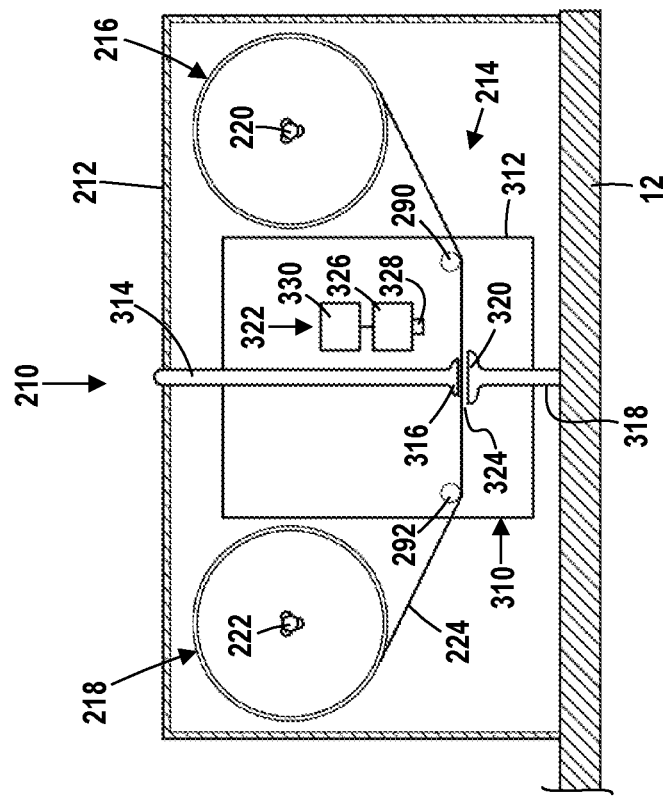
FIG. 7 is a sectional side view of an alternate embodiment seed dispensing assembly.
Figure 6:
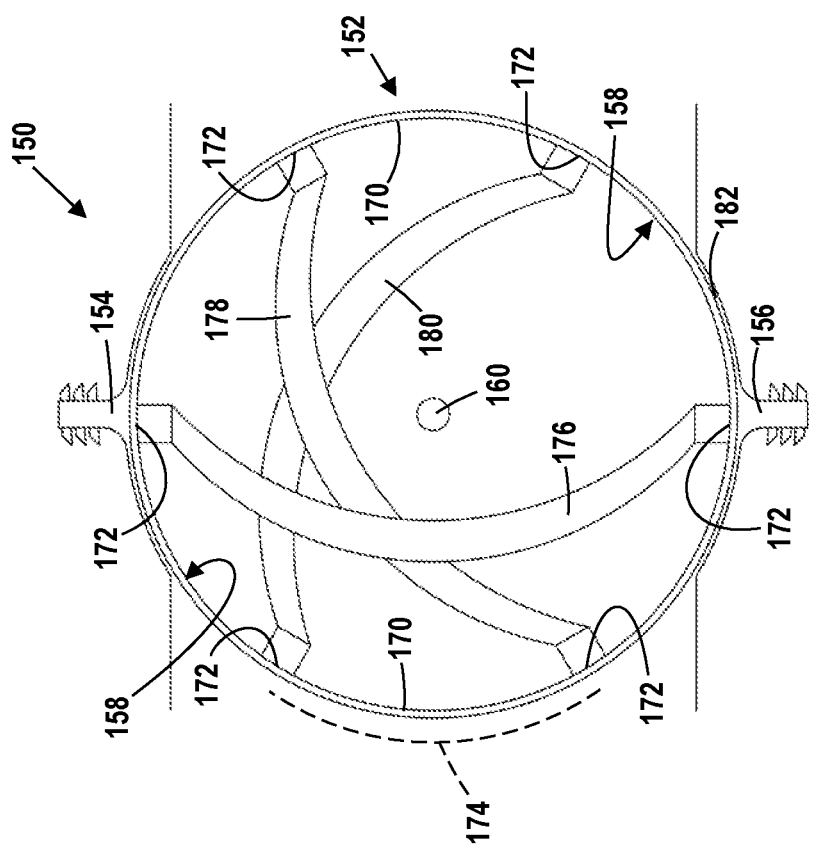
FIG. 6 is a sectional side view of an air distribution wheel assembly used with the device.

FIG. 7 illustrates an alternate embodiment seed dispensing assembly 210 mounted to frame 12. Assembly 210 shares similar elements with seed dispensing assembly 110 including an enclosure 212, a seed tape assembly 214 having seed tape storage reel 216 and take-up reel 218, and a length of seed tape 224 containing a quantity of seed units 230 located at regular distance intervals 232 along seed tape 224. Tape storage reel 216 and take-up reel 218 are mounted on spindle shafts 220 and 222. Rollers 290, 292 assist in directing seed tape 224 between reels 216 and 218.

Seed dispensing assembly 210 includes an air distribution unit 310. Unit 310 includes a frame 312 mounted to seed dispensing assembly 210. Air input tube 314 extends from an air source (not illustrated) to a tube outlet 316. Seed chute 318 extends from a seed chute inlet 320 downwardly to a chute outlet under frame 12, like seed chute outlet 148.

Air distribution unit 310 includes seed sensor assembly 322 and a seed tape passage 324 through which a length of seed tape 224 extends. Seed tape passage 324 is located between rollers 280 and 282 extending generally between tube outlet 316 and chute inlet 320.

Seed sensor assembly 322 includes a photoelectric sensor 326 having a light collection sensor 328 directed at seed tape 224 and seed units 230 at or immediately adjacent seed tape passage 324. Photoelectric sensor 326 may be a light sensor capable of converting light energy into an electrical signal. In embodiments, sensor 326 may be a digital camera and light collection sensor 328 may be a digital camera lens. Photoelectric sensor 326 is coupled to an electronic controller 336. In embodiments, controller 336 may be a programmable logic controller (PLC) or like controller containing a microprocessor.

In an alternate embodiment seed dispensing assembly 210, the spindle shaft 222 in air distribution unit 310 may be coupled to a spindle drive including a drive motor (not illustrated). The spindle drive turns spindle shaft 222 to likewise turn take-up reel 218. In embodiments, the drive motor may be a stepper motor, capable of advancing spindle shaft 222 and take-up reel 218 in a series of predetermined rotations or partial rotations of shaft 222. The rotations or partial rotations of shaft 222 likewise advance seed tape 224 from seed tape storage reel 216 to take-up reel 218 in a series of advancement turns. These turns allow advancement of a predetermined length of seed tape 224 from reel 216 to reel 118. The predetermined length of seed tape 224 may correspond to the regular distance intervals 232 between adjacent seed units 230 on seed tape 224.

Use of device 10 will now be described.

Figure 8:
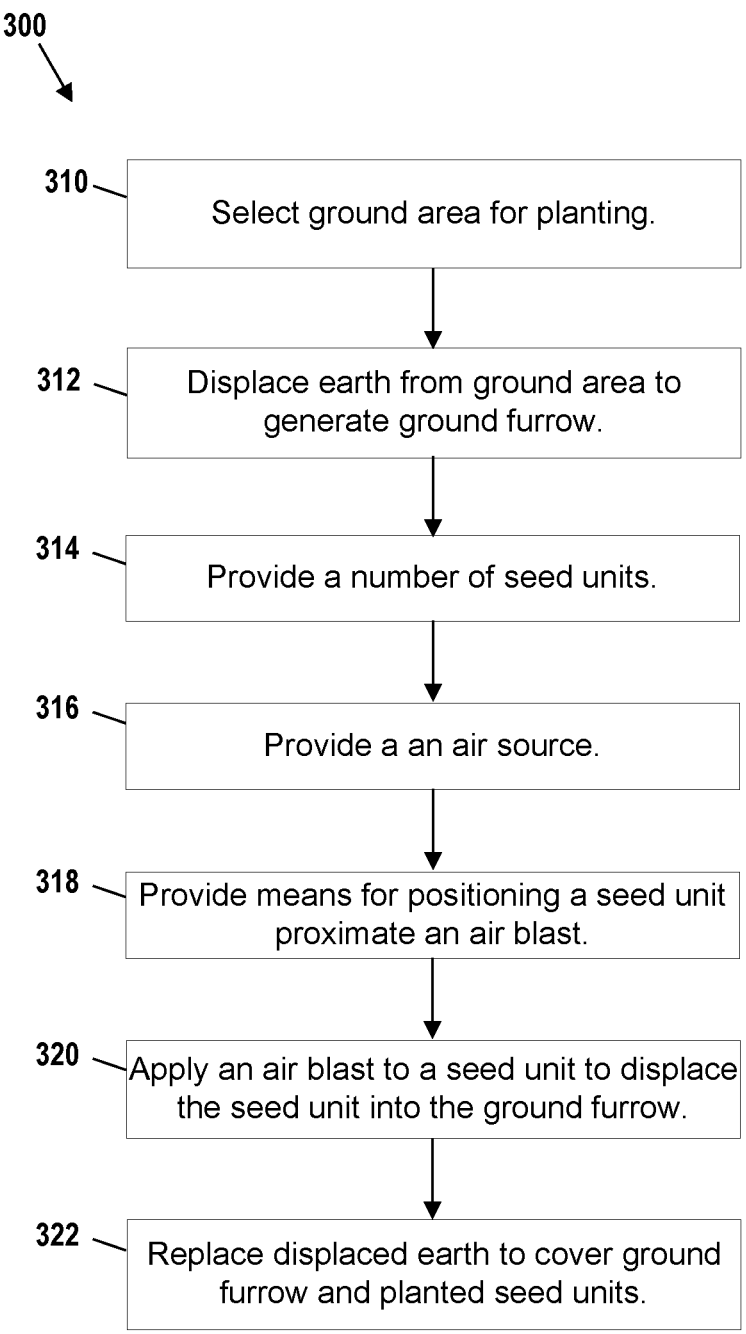
FIG. 8 is a flow chart illustrating example steps in the disclosed method of planting.

The flowchart of FIG. 8 discloses a general method 300 of planting according to the present disclosure.

Starting at step 310, an operator selects a ground area for planting and directs planter device 10 along a selected seeding path.

At step 312, the operator configures furrow generator 66 and earth coverer 70 to generally engage the ground 100. Motor drives axle 48 to turn rear axle 24 and propel device 10 forward. As device 10 travels forward, furrow generator 66 creates a ground furrow 102 by displacing earth material from the ground 100.

Through steps 314 through 320, the operator activates the seed dispensing assembly to dispense seed units into ground furrow 102.

At step 314, the seed dispensing assembly provides a number of seed units 130, 230 for planting. As broadly disclosed herein, seed units may be sorted on a seed tape storage reel 116, 216. In alternate embodiments, seed units may be sorted in a conventional seed hopper or like container.

At step 316, the seed dispensing assembly provides an air distribution unit adapted to applying air blasts to seed units. As indicated above, air blasts may be provided by an air source such as an air compressor or a canister of compressed air or another like gas.

At step 318, the seed dispensing assembly provides means for positioning a seed unit proximate an air blast. As broadly disclosed herein, seed units sorted on a seed tape storage reel 116, 216 may be moved proximate the above disclosed air passageways for transmitting an air source to a seed unit.

In disclosed air distribution unit 136, this is accomplished by air distribution wheel assembly 150. In operation, assembly 150 positions a through passage 176, 178, 180 over a seed unit 130 on seed tape 124 when the seed unit is located over seed chute inlet 146. In this position, an air blast flowing from the air source flows from air input tube 140 through a passage 176, 178, 180 to be applied to a seed unit 130.

In embodiments, seed tape 224 may progress from reel 116 to 118 at a similar rate to the turning of air distribution wheel 158 to assure that seed tape is only subjected to air blasts when a seed unit 130 is located over seed chute inlet 146. In alternate embodiments, the arc distance 174 between adjacent air apertures 172 on wheel 158 may be similar to the distance intervals 132 between adjacent seed units 130 on tape 124 to likewise assure that the seed tape properly feeds through air distribution unit 136 so that the seed tape is only subjected to air blasts when a seed unit 130 is located over seed chute inlet 146.

The proper feeding of seed tape through disclosed air distribution unit 310 may be accomplished by seed sensor assembly 322. Seed sensor assembly 322 detects the location of seed units 130 along tape 124 through the use of photoelectric sensor 326. Sensor 326 detects when seed units 130 are located over seed chute inlet 320 and sends an electrical signal to controller 336. Controller 336 may then send a corresponding signal to the air source to generate an air blast to be applied to seed unit 130.

The proper feeding of seed tape through the alternate embodiment air distribution unit 310 is accomplished by the use of a stepper motor to turn shaft 222 and take-up reel 218. The stepper motor is capable of advancing spindle shaft 222 and take-up reel 218 in a series of predetermined rotations or partial rotations of shaft 222. As indicated above, the rotations or partial rotations of shaft 222 likewise advance seed tape 224 from seed tape storage reel 216 to take-up reel 218 in a series of advancement turns. These turns may allow advancement of a predetermined length of seed tape 224 from reel 216 to reel 118 corresponding to the regular distance intervals 232 between adjacent seed units 230 on seed tape 224. This may allow seed dispensing assembly 210 to predictably position seed units 130 and stop the stepper motor and take-up reel 218 at intervals so that a given seed unit 130 is located over seed chute inlet 320 and so that a timed air blast may be applied to the seed unit.

At step 320, the seed dispensing applies an air blast to displace a seed unit 130 from seed tape 124, into chute inlet 146, downwardly through chute 144, 320 and out of chute outlet 148 into ground furrow 102. See FIG. 2. The air blast is of sufficient force to break a seed unit 130 free from seed tape 124 and through chute 144, 320. The air blast may be of additional sufficient force to locate the seed unit into the bottom of ground furrow 102 so that the seed unit is partially implanted into the ground at the bottom of the furrow and partially secured in place.

Air blasts may be actuated in a timed, periodic manner to seed units by a device controller like or identical to electronic controller 336 as described above.

After step 320, an operator may apply a quantity of water 65 onto seed units 130 placed in ground furrow 102 through use of water dispensing assembly 52.

At step 322, as device 10 continues to travel forward, earth coverer 70 replaces earth material displaced by furrow generator 66 to cover furrow 102 to fully plant seed units 130.

While one or more embodiments of the assembly have been disclosed and described in detail, it is understood that this is capable of modification and that the scope of the disclosure is not limited to the precise details set forth but includes modifications obvious to a person of ordinary skill in possession of this disclosure and also such changes and alterations as fall within the purview of the following claims.

The invention claimed is:

1. A seed planting device comprising a frame having a front portion and a rear portion, conveyance means mounted to said frame and supporting said frame above a ground area, steering means mounted to said frame and coupled to said conveyance means, a furrow generator mounted to said frame proximate said front portion and engaging said ground area, an earth coverer mounted to said frame proximate the rear portion and engaging said ground area, a see dispensing assembly mounted to said frame, the seed dispensing assembly comprising a seed tape assembly, an air distribution unit, and a seed chute, said seed tape assembly comprising a length of seed tape, said length of seed tape being flexible and comprising one or more seed units, said seed chute extending from a chute inlet proximate the frame to a chute outlet extending from the frame toward said ground area, said chute outlet between said furrow generator and said earth coverer, said length of seed tape and said one or more seed units proximate said chute inlet wherein said air distribution unit is adapted to apply an air blast to said length of seed tape to displace a seed unit from said length of seed tape and into said seed chute.

2. The seed planting device of claim 1 wherein said length of seed tape extends between a seed tape storage reel and a seed tape take-up reel.

3. The seed planting device of claim 2 wherein said one or more seed units comprises one of more ungerminated seeds.

4. The seed planting device of claim 2 wherein said air distribution unit comprises an air distribution wheel.

5. The seed planting device of claim 2 wherein said air distribution unit comprises a photoelectric sensor having a light collection sensor.

6. The seed planting device of claim 5 wherein said photoelectric sensor comprises a digital camera and said light collection sensor comprises a digital camera lens.

7. The seed planting device of claim 2 wherein said air distribution unit comprises a stepper motor, said stepper motor actuating said seed tape take-up reel.

8. The seed planting device of claim 2 having a motor mounted to said frame, said motor coupled to said conveyance means.

9. The seed planting device of claim 8 wherein said conveyance means comprise wheels.

10. The seed planting device of claim 1 wherein said length of seed tape comprises first and second substrate layers, said one or more seed units located between said first and second substrate layers.

11. A seed planting device comprising:
 a frame above a ground area, said frame comprising a front portion and a rear portion, conveyance means, steering means, a furrow generator, an earth coverer and a seed dispensing assembly;

said furrow generator proximate said front portion and engaging said ground area, said earth coverer mounted to said frame proximate the rear portion and engaging said ground area;

said seed dispensing assembly comprising a seed tape assembly, an air distribution unit, and a seed chute;

said seed tape assembly comprising a flexible length of seed tape, said flexible length of seed tape comprising one or more seed units;

said seed chute extending from a chute inlet proximate the frame to a chute outlet extending from the frame toward said ground area, said chute outlet between said furrow generator and said earth coverer;

said flexible length of seed tape and at least one seed unit of said one more seed units proximate said chute inlet wherein said air distribution unit is adapted to apply an air blast to said flexible length of seed tape to displace a seed unit from said flexible length of seed tape and into said seed chute.

12. The seed planting device of claim 11 wherein said conveyance means is mounted to said frame and said steering means is mounted to said frame and said steering means is coupled to said conveyance means.

13. The seed planting device of claim 12 wherein said conveyance means comprises a motor.

14. The seed planting device of claim 11 wherein said flexible length of seed tape comprises first and second substrate layers, said one or more seed units located between said first and second substrate layers.

15. The seed planting device of claim 14 wherein said a seed tape assembly comprises a seed tape storage reel and a seed tape take-up reel and said flexible length of seed tape extends between said seed tape storage reel and said seed tape take-up reel.

16. The seed planting device of claim 15 wherein said air distribution unit comprises an air distribution wheel and a stepper motor, said stepper motor actuating said seed tape take-up reel.

17. The seed planting device of claim 16 wherein said one or more seed units comprise one or more ungerminated seeds.

18. The seed planting device of claim 11 wherein said air distribution unit comprises a photoelectric sensor having a light collection sensor.

19. The seed planting device of claim 18 wherein said photoelectric sensor comprises a digital camera and said light collection sensor comprises a digital camera lens.

20. The seed planting device of claim 11 wherein said ground furrow generation means comprises a furrow blade and said conveyance means comprises wheels.

\* \* \* \* \*